US 8,327,371 B2

(12) United States Patent
Horii et al.

(10) Patent No.: US 8,327,371 B2
(45) Date of Patent: Dec. 4, 2012

(54) MULTINODE SERVER SYSTEM, LOAD DISTRIBUTION METHOD, RESOURCE MANAGEMENT SERVER, AND PROGRAM PRODUCT

(75) Inventors: Hiroshi Horii, Yamato (JP); Toshihiro Takahashi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 12/365,185

(22) Filed: Feb. 4, 2009

(65) Prior Publication Data

US 2009/0199198 A1 Aug. 6, 2009

(30) Foreign Application Priority Data

Feb. 4, 2008 (JP) ................................. 2008-24207

(51) Int. Cl.
*G06F 15/177* (2006.01)
(52) U.S. Cl. ...................................... 718/104; 709/226
(58) Field of Classification Search .................. None
See application file for complete search history.

(56) References Cited

U.S. PATENT DOCUMENTS

| | | | | |
|---|---|---|---|---|
| 5,560,013 | A * | 9/1996 | Scalzi et al. | 717/138 |
| 7,133,805 | B1 * | 11/2006 | Dankenbring et al. | 702/186 |
| 7,610,186 | B2 * | 10/2009 | Odhner et al. | 703/21 |
| 2003/0177187 | A1 * | 9/2003 | Levine et al. | 709/205 |
| 2007/0117631 | A1 * | 5/2007 | Lim et al. | 463/42 |

FOREIGN PATENT DOCUMENTS

| | | |
|---|---|---|
| JP | 9325991 | 12/1997 |
| JP | 11039472 | 2/1999 |
| JP | 11288394 | 10/1999 |
| JP | 11328124 | 11/1999 |
| JP | 2000285064 | 10/2000 |
| JP | 2005234633 | 9/2005 |

OTHER PUBLICATIONS

Ng, Beatrice etal., A Multi-Server Architecture for Distributed Virtual Walkthrough, 2002, ACM pp. 163-170.*
Rishe, Naphtali etal., System Architecture for 3D Terrafly Online GIS, 2004, IEEE, 4 pages.*

* cited by examiner

*Primary Examiner* — Eric Coleman
(74) *Attorney, Agent, or Firm* — Jon A. Gibbons; Fleit Gibbons Gutman Bongini & Bianco PL

(57) ABSTRACT

A multinode server system includes several servers mutually connected, each of which processes one mesh obtained by dividing a virtual space. The virtual space is displayed as a result of processing of each mesh by the servers. A resource management node detects load states of the servers, and changes allocation of the servers to process the meshes in accordance with the load states. A network allows several clients to share the virtual space. The servers processing the meshes are changed while giving priority to an adjacent mesh beyond a server border in response to the load states.

16 Claims, 11 Drawing Sheets

| MESH IDENTIFICATION VALUE | ADDRESS | MESH CAPABILITY STATE | RESOURCE DATA | MOVING PROCESSING STATE IDENTIFICATION VALUE |
|---|---|---|---|---|
| 1 | aaaa/bbbb/cccc/dddd | A | MESH SPECIFIC DATA, USER SPECIFIC DATA, OBJECT (CHARACTER) SPECIFIC DATA | 0 |
| 2 | aaaa/bbbb/cccc/defg | B | MESH SPECIFIC DATA, USER SPECIFIC DATA, OBJECT (CHARACTER) SPECIFIC DATA | 0 |
| 3 | aaaa/bbbb/cccc/hijk | C | MESH SPECIFIC DATA, USER SPECIFIC DATA, OBJECT (CHARACTER) SPECIFIC DATA | 0 |
| 4 | aaaa/bbbb/cccc/lmno | D | MESH SPECIFIC DATA, USER SPECIFIC DATA, OBJECT (CHARACTER) SPECIFIC DATA | 1 |
| ... | ... | ... | ... | ... |
| NODE CAPABILITY STATE | (A+B+C+D+...) / Pmax | | | |

FIG. 5

| MESH IDENTIFICATION VALUE | CURRENT EXECUTION NODE $S_p$ | LATEST OPTIMUM DESTINATION (GIVING $S_{res}$) |
|---|---|---|
| 1 | NODE 2 | |
| 2 | NODE 2 | |
| 3 | NODE 2 | |
| 4 | NODE 2 | NODE 1 |
| 5 | NODE 2 | |
| 6 | NODE 2 | |
| 7 | NODE 2 | NODE 1 |
| 8 | NODE 2 | NODE 1 |
| 9 | NODE 2 | |
| 10 | NODE 2 | |
| 11 | NODE 2 | NODE 1 |
| 12 | NODE 1 | |
| 13 | NODE 1 | |
| 14 | NODE 2 | NODE 1 |
| 15 | NODE 1 | |
| 16 | NODE 1 | |

FIG. 6

MULTINODE SERVER SYSTEM, LOAD DISTRIBUTION METHOD, RESOURCE MANAGEMENT SERVER, AND PROGRAM PRODUCT

CROSS REFERENCE TO RELATED APPLICATION

This application claims priority under 35 U.S.C. 119 from Japanese Patent Application No. 2008-24207 filed Feb. 4, 2008, the entire contents of which are incorporated herein by reference.

BACKGROUND OF THE INVENTION

1. Field of the Invention

The present invention relates to load distribution for a multinode server system. More particularly, the present invention relates to a multinode server system, a load distribution method for a multinode server system, a resource management server, and a program. Coordination of the foregoing provide the processing to specific client devices using a plurality of servers.

2. Description of Related Art

In recent years, the development of network and computer techniques has enabled information to be provided to a plurality of client devices via a network, as well as services to be provided using Common Gateway Interface (CGI), Servlet, game applications and other server applications. Upon receipt of access requests from several client devices at irregular and unpredictable intervals, servers need to execute processing complying with a request from each client device, and return a result of the execution to the client device.

Further, servers have provided wide-ranging services, including information search services, browsing services, game amusement providing services, etc. Among them, the game amusement providing service provides the stand-alone type game letting a player play a game on a screen specific to each user, as well as the type enabling concurrent connection of a lot of players to a game server so that individual players can share a huge virtual space and proceed with a game in coordination with each other while collaborating.

A game server providing the above-described game amusement providing service will be exposed to an environment different from that for a server providing an information search or a browsing service. That is, the server providing an information search service or a browsing service allocates a thread or the like in response to a request from a client and simply returns the processing result to the client that issued the request. In this case, although collaboration may be performed among other clients, returning the processing result in collaboration to all or the majority of the clients is an extremely rare case.

On the other hand, a game server needs to display, to clients, the processing result of a game application such as match-up, life, or investment in a virtual space of a game space while allowing the players to collaborate with each other. Further, in recent years, the game contents have become increasingly complicated and diversified, and the number of users for the concurrent connection has been also increased, so that along with a larger scale of the game environment, processing on the server side has been increasingly requested to be complicated as well as to be speeded up and have higher reliability.

From the viewpoints of maintainability for backup when a server is down or for server expandability in addition to the above-described throughput and the diversification of the network environment, a plurality of servers are connected by a local area network (LAN), so that the game server is configured using mutually connected server nodes, where the servers function as LAN nodes.

When the game server is configured by a plurality of server nodes, the communication speed via the LAN will be a transfer rate of 1 Gbps or less, which depends on the network interface card (NIC) or the like, and therefore it will be slower than the transfer rate within a server. Further, the LAN deals with not only the application processing between servers but also the information communication for network communication via a hub, a router, a DNS server and the like. When the transfer rate of the network infrastructure constituting the LAN is increased, the outgoing or incoming data via the LAN also increases accordingly, and therefore there is a problem that such an increase in the transfer rate does not lead to the improvement of the transfer efficiency of the data communication required for application execution.

In other words, when a plurality of servers are connected as LAN nodes, there is a problem that the process efficiency of a so-called multinode server system configured by mutually connecting a plurality of servers via a LAN cannot be improved efficiently unless the data transfer concerning the application execution is made efficient.

In the case of an application such as a game, the congestion of a specific region (hereinafter referred to as a "mesh") in the virtual space will always vary depending on the time, the progress of a game, the preference of a user, and the game contents. Thus, how to distribute the computational resource among server nodes will be a big issue. If the computational resource cannot be distributed appropriately among the server nodes, the limited performance of a single server node (e.g., the number of players connectable concurrently) cannot enable it to respond to a request from the player, resulting in a so-called processing failure in which something goes wrong with the processing of the game.

Additionally, even if the system has a performance that can sufficiently respond to the collaboration between the respective meshes as long as the data is transmitted within a single server, the communication efficiency between the meshes may be degraded due to data congestions in the LAN, which may lead to a decrease in the communication efficiency between the meshes, resulting, for example, in disturbance of the collaboration in the virtual space and the loss of data.

If the arrangement of the computational resource is changed during the game, it takes time to select a server node that can manage the processing, allocate the computational resource and the like. Further, when accessing the virtual space, the clients do not always access the vicinity of the same mesh concurrently. Thus, when the computational resource is rearranged, since a mesh or a server exists with the processing load being closer to overflow, response to a client that accesses the vicinity of the mesh without a high throughput is limited.

A game system allowing a plurality of players to play a game is well known. For instance, Japanese Unexamined Patent Publication (Kokai) No. 2005-234633 (Patent Document 1) discloses a service expansion method, in which a plurality of servers provide their respective services, and these services construct and couple the virtual world freely, thus enabling free movement within the virtual world. According to Patent Document 1, the coupled virtual world is constructed while distributing their processing over the individual servers in predetermined units, and the result thereof is provided to clients. In Patent Document 1, a virtual community is allocated to the servers, and if a client goes beyond the interface set for the server, information on the client is passed to the server that manages a new virtual community, thus enabling the processing in the new virtual community.

In Patent Document 1, however, a specific virtual community is allocated to a server, and the client decides which virtual community will be the destination, thus deciding which server will be in charge of the processing. Thus, it is impossible in Patent Document 1 to change the server in charge of the processing in response to the congestion state of the virtual community. Further, Japanese Unexamined Patent Publication (Kokai) No. H09 (1997)-325991 (Patent Document 2) discloses a technique enabling an increase in the number of participants, and in order to reduce the strangeness that might occur when the virtual world is divided into regions, a server is placed at each of the adjacent regions so that small regions overlap with each other between the adjacent regions.

Japanese Unexamined Patent Publication (Kokai) No. H11 (1999)-039472 (Patent Document 3) discloses a process of allocating a space and a server to a user in accordance with a distance between a fixed point and a new user's location, so as to reduce the computational amount for collision inspection or the like that is required when the user moves. Japanese Unexamined Patent Publication (Kokai) No. H11 (1999)-288394 (Patent Document 4) discloses, in order to solve the problem of an increase in data exchange amount between game servers caused by an increase in the number of participants to the game, a process of limiting game terminals capable of exchanging a message in accordance with a communication distance between the game terminals. Japanese Unexamined Patent Publication (Kokai) No. H11 (1999)-328124 (Patent Document 5) discloses a process of alleviating the load of rendering the virtual space, and Japanese Unexamined Patent Publication (Kokai) No. 2000-285064 (Patent Document 6) discloses a process of providing a user information data base so as to ensure the unity of a user and a character in the virtual space service, thus improving operability.

As described above, the environment includes a plurality of systems providing a virtual space using a plurality of servers. However, a multinode server system, a load distribution method for the multinode server system, a resource management server, and a program are still required, which are capable of distributing the hardware resource of a plurality of servers so as to respond to an increase in the number of clients and the overhead of the processing in a mesh by effectively distributing the resource of each server in the process of meshes in the virtual space provided by the plurality of servers.

Also required are a load distribution method for a multinode server system, a resource management server, and a program, by which reliability can be improved by minimizing the occurrence of the inconvenience of a so-called "processing failure" causing the disability of the processing to a specific client in an environment where the number of clients participating in the virtual space always varies depending on the time, their preferences, and the contents of the virtual space.

Further required are a load distribution method for a multinode server system, a resource management server, and a program, which are capable of effectively utilizing the resource of the multinode server system constructed by a plurality of servers while distributing the load so that the maximum throughput of the server system is not limited to a specific server's processing ability, thus maximizing the processing efficiency of the multinode server system.

SUMMARY OF THE INVENTION

The present invention addresses the above-stated problems of prior techniques. In the present invention, regions (meshes) are allocated to a virtual space so that the virtual space is divided into adjacent meshes. A resource for executing an application is allocated to a specific server in the units of meshes. The load distribution among the servers is changed by periodically monitoring the utilization state of the hardware resource consumed by the meshes and selecting a server in charge of the mesh based on the actually measured values.

Further, for the present invention, when the servers processing the meshes are to be rearranged, the optimum mesh allocation is autonomously decided among the plurality of servers with consideration given to the time required for suspension involved in the rearrangement, the burden on clients who access the meshes not relating to the mesh allocation change, and the rearrangement cost such as system performance. In other words, according to the present invention, the multinode server system changes the servers allocated to target meshes so as to enable the processing with optimum efficiency using a plurality of servers, and system performance is optimized.

When the data transfer is limited by the inter-mesh communication via the LAN, border meshes are selected including a mesh border between adjacent meshes processed by different servers so that the inter-mesh communication can be intra-node communication without via the LAN, thus changing the server allocation for processing the meshes. If application execution is limited by the server capability such as the CPU load or a memory utilization factor, meshes are selected sequentially as a moving target from the border meshes, and the server allocation is changed so as to minimize an upper limit of an objective function by making a server with a lowest processing load process meshes with a high processing load, for example.

In order to change the server allocation as stated above, the present invention uses the objective function including a parameter indicating a load state and a total number of meshes as a processing target to which the servers are allocated. The objective function includes, as parameters, server load states such as a CPU load, a memory utilization factor, and an inter-mesh communication amount, as well as the total number of the meshes to be moved. The multinode server system generates a mesh set including the meshes to be moved as elements by repeatedly selecting the mesh-server allocation so that the upper limit of the objective function given by the respective parameters can be a minimum, calculates an optimum arrangement data using this mesh set, and stores the same in a memory or the like. If the load state of a server exceeds a set threshold, a moving processing program is called, and the server allocation for constituting the multinode server system is changed in accordance with the optimum arrangement data.

The meshes for changing allocation are in exclusive control of processing, at least for writing processing. Thus, even while the server allocation is proceeding, clients who access the meshes not relating to the allocation are allowed to continue application execution using the virtual space including the meshes that they have accessed. Therefore, with respect to the resource allocation change of the multinode server system, the application can be provided to the clients at a minimum cost in terms of the burden on the system and the client side.

BRIEF DESCRIPTION OF THE DRAWINGS

The present invention, the preferred modes of making and using it and other goals and advantages will be readily understood when referring to the description of illustrative embodiments in connection with the drawings, in which:

FIG. 5 illustrates one embodiment of a mesh management table that the respective nodes constituting the application execution unit manage, which functions as mesh management means;

FIG. 6 illustrates one embodiment of optimum arrangement data that the optimum arrangement data registration unit of the resource management node manages;

DETAILED DESCRIPTION OF THE PREFERRED EMBODIMENTS

Figure 1:
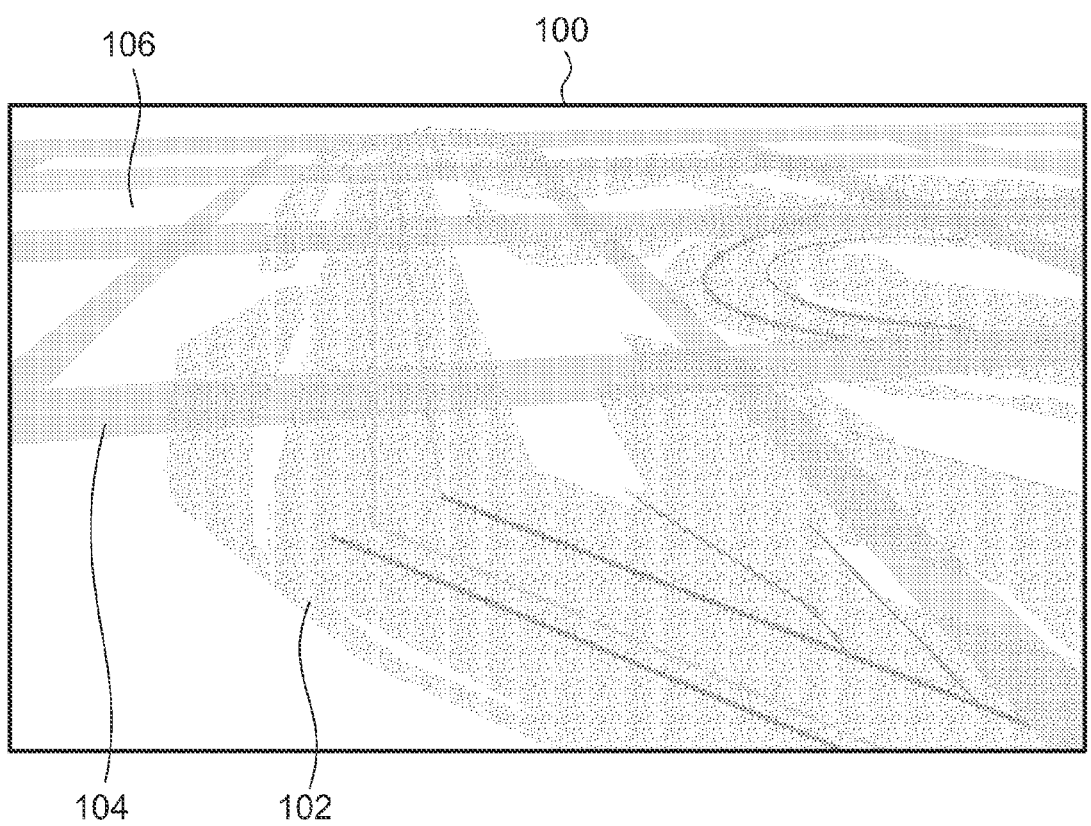
FIG. 1 illustrates one embodiment of mesh division in a virtual space by a multinode server system.

Referring to FIG. 1, one embodiment of mesh division in a virtual space by the multinode server system of the present invention is shown. The multinode server system allows more than one client to access it via a network, thus enabling the processing by an application common to those clients. The application may include a multimedia display, a match-up type game, a virtual life game, or an investment simulation game, which enables a plurality of clients to play the game in a collaborative environment in a virtual space.

The invention is not limited to any particular type of application as long as the application is capable of displaying a 2-dimensional (2D) or 3-dimensional (3D) virtual space on a display screen of a client and enables a plurality of clients to share the virtual space. To "share the virtual space" by clients is not limited to a virtual space displayed by a game as long as the client can access the virtual space to request processing.

As used below, the term "server computer" is defined as an information processing apparatus that provides a service in cooperation between hardware and software, which will be simply referred to as "a server". An individual server that is a functional element in the local area network (LAN) will be referred to as a "node". The term "client device" used herein is defined as an information processing apparatus that is connected with a server remotely, issues a processing request to the server, and receives a processing result by the server to continue the processing, which will be simply referred to as "a client".

The client is operated by a user. It requests the processing of an application to a multinode sever system. The multinode system executes the processing corresponding to the request, and reflects the processing result to the virtual space displayed on the display device of the client for response.

In the embodiment of the virtual space 100 of FIG. 1, a road 102 is displayed on the 3D-displayed virtual space for a driving game or the like. A user operates a vehicle such as a passenger car, a sports car, or a racing car on the road 102 in the virtual space 100 to have a race with other clients. The multinode server system divides the virtual space 100 into a plurality of meshes, displays the meshes on the display screen of the client, and manages the processing in each mesh. These meshes are indicated by mesh borders 104 crossing each other in the virtual space 100 of FIG. 1, and a single mesh 106 is defined within the mesh borders 104.

The size of a mesh is not limited, and the meshes can be allocated based on any criterion concerning the pixel number, the virtual distance, and the area in the virtual space 100 as long as the virtual space 100 can be divided without leaving space. When the client moves to a mesh 106, the client executes the application using resource data allocated to the mesh. To this end, the meshes can be implemented with a memory region such as RAM being allocated in a variable size. In order to secure consistency of data, meshes may include a configuration enabling exclusive control such as a flag, a table, or semaphore.

The multinode server system manages, in units of the meshes 106, a CPU, a memory, user data, display object data and the like of a server in charge of the processing thereof, and executes the processing. If a user moves to an adjacent mesh, the user data, the display object data and the like are communicated between the adjacent meshes so that the application processing is passed from the current mesh to the adjacent mesh, thus keeping the processing of the game or the like without leaving strangeness to the user. When adjacent meshes are allocated to the same node, intra-mesh communication is executed by the intra-process communication or the like, whereas when adjacent meshes are allocated to different nodes, the inter-mesh communication is executed using MAC transfer via a LAN, for example.

Figure 2:
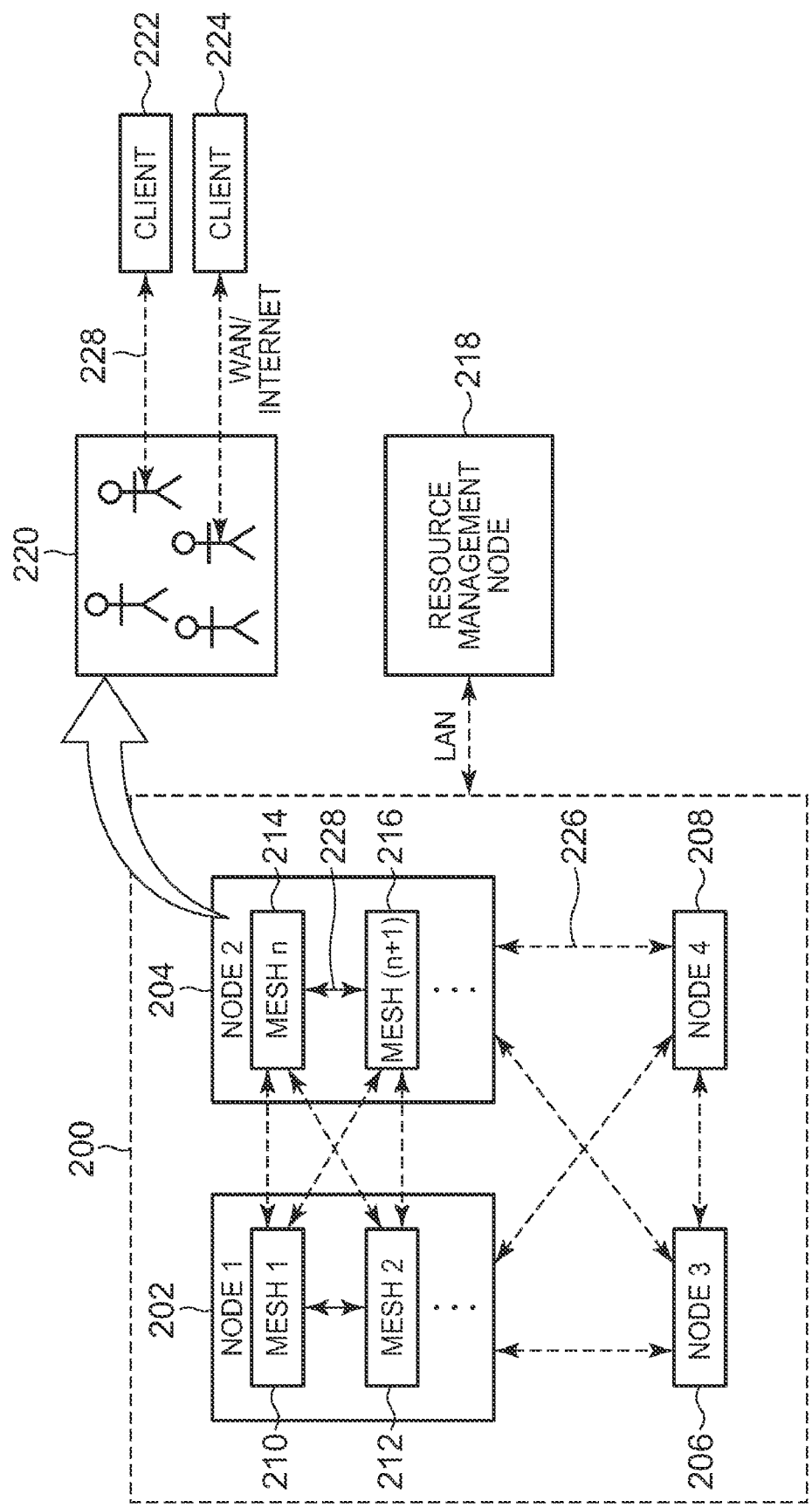
FIG. 2 is a functional block diagram of the multinode server system of the present embodiment.

Referring to FIG. 2, a functional block diagram of the multinode server system of the present embodiment is shown. The multinode server system includes a plurality of nodes 202, 204, 206, 208, and 218 as nodes, which are connected via a LAN. These nodes are further connected mutually via network equipment such as a bridge, a switch, a hub, a router, and the like. The nodes 202, 204, 206, 208, and 218 can be configured using conventionally known general-purpose servers including a CPU, a cache memory, a RAM, a network adaptor and the like or using an appliance server, a thin server or the like that is configured for a specific application.

A server giving a node makes an operating system (OS) execute such as UNIX, LINUX, AIX, Windows 200X server or the like, and manages the processing of various applications. As the CPU, a single core processor or a multicore processor having RISC architecture such as POWERPC or CISC architecture such as PENTIUM, on which L2 cache, L3 cache or the like can be implemented in addition to main cache as needed.

The multinode server system of FIG. 2 includes an application execution unit 200, and a resource management node 218 functioning as resource management means that manages the computational resource of the application execution unit 200. In the embodiment of FIG. 1, the application execution unit 200 includes the node 202, the node 204, the node 206, and the node 208. The nodes communicate with each other via a LAN 226, and perform data transmission and notification between the nodes by referring to a Media Access Control (MAC) address table managed by network equipment. The resource management node 218 is similarly connected with the application execution unit 200 via the LAN, thus collecting various types of information from the nodes constituting the application execution unit 200 or providing information for performing the resource distribution to the nodes.

The LAN 226 may be configured using a wired LAN such as Ethernet (registered trademark) including 1000BASE-T, 1000BASE-TX, or the like, a wireless LAN such as IEEE802.X, or Bluetooth (registered trademark), IrDa or the like.

In the embodiment of FIG. 1, node identification values such as node 1, node 2, . . . are assigned to the nodes 202, 204, 206, and 208, respectively, constituting the application execution unit 200. The node identification values can be assigned together with MAC addresses, IP addresses and the like, allowing a specific node to be identified uniquely over the network. In the case where the IP addresses are assigned to the nodes, a global IP address is allocated to each node, thus enabling access from a user.

In the embodiment of FIG. 2, in order to execute an application, the node 202 manages a plurality of meshes 210, 212, . . . . For example, the mesh 210 executes the processing of the mesh 106 shown in FIG. 1 that is allocated in the virtual space 100 provided by the application, so as to execute the display of the virtual space region allocated to the mesh 106, the user identification, the object display processing, the object move processing and the like. The mesh 210 of the node 202 executes, in some specific embodiments, calling of a hit and special game, the allocation and the display of a special item and the like in response to the operation of a hot spot, a hidden button or the like.

The mesh 210 is created by allocating, by the node 202, the resource data or the like registered in the hard disk device to the execution space provided with a RAM or the like during the application execution. The memory size of each mesh is variably set to an allocation size such that the node 202 can permit in response to the processing request in the mesh. For instance, it can deal with the overhead of the processing in the node 202 within a permissible range in response to the request of the application, for example. In the case where the application execution unit 200 is implemented as a web server, each mesh has a Uniform Resource Identifier (URI) specified by RFC2616 or Uniform Resource Locator (URL) specified by RFC3986 assigned thereto. In other embodiments, a mesh can be identified uniquely using an absolute path name or a relative path name.

Each node can receive a request from the client using TCP/IP protocol, UDP/IP protocol or the like, and return the processing result in the mesh as a HTTP response or the like. The multinode server system typically can be implemented as a web server, a game server, or a multimedia server. When the application execution unit 200 is a web server, each node receives access from the client using HTML protocol, and returns a response. Alternatively, the application execution unit 200 in the multinode server system may be implemented using a distributed computing environment such as Remote Method Invocation (RMI), Remote Procedure Call (RPC), CommonObject Resource Broker Architecture (RBA), JAVA, Enterprise Java, Beans: EJB) or the like, instead of the web server. In addition, the multinode server system may be configured as a dedicated system for the mutual communication exclusively for specific clients. The application execution unit 200 and the nodes 202, 204, 206, and 208 constituting the application execution unit 200 may include, as means for displaying the respective processing results to the client, a network adaptor and a network interface card (NIC) capable of transmitting image data via a network using appropriate protocol as network means implemented thereto.

Each node is required to execute the processing at a specific mesh, and transmit, in response to an instruction from a client, data on the client or a mesh moving instruction or the like for a specific client to another mesh. In the case of the same node, intra-processor communication or intra-process communication such as signaling is available as the inter-mesh communication, so that, in the case of the mesh switching in the same node, the processing can be conducted at a processor cycle level. On the other hand, in the case where meshes processed by different nodes perform inter-mesh communication, the mutual communication may be conducted via the LAN 226 between the different nodes. Thus, the inter-mesh communication via the LAN 226 will degrade the processing efficiency of the multinode server system as a whole as well as the reliability of the processing. For at least those reasons, the inter-mesh communication is preferably conducted within a single server, or so-called intra-node communication, instead of between the different servers, so as to minimize the inter-mesh communication via the LAN 226 in terms of the improvement of the performance of the multinode server system.

Further, as shown in FIG. 2, network means is constituted with a plurality of clients 222 and 224 in a specific mesh 220 in the node 2, so that users access thereto via a network infrastructure 228 configured as a remote server such as NIC, a DNS server, or a gateway server, a router, or a web browser/server program to use the resource allocated to the mesh 220 for the execution of the application under the collaboration environment over the virtual space 100. Herein, the client uses a personal computer, a mobile phone, or a Portable Data Assistant (PDA) to access the application execution unit 200 via a communication infrastructure such as Wide Area Network (WAN) or INTERNET for request of the application processing.

Figure 3:
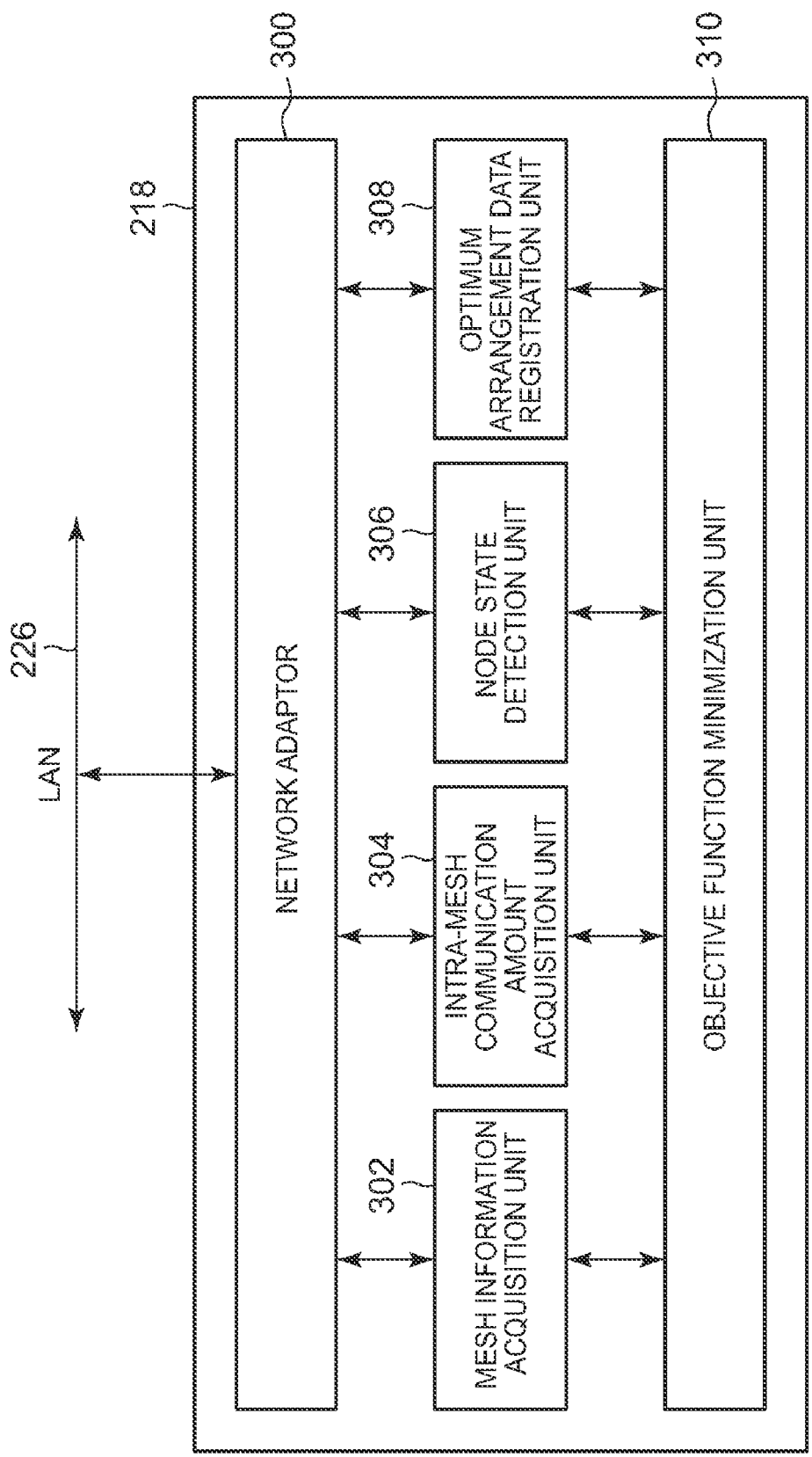
FIG. 3 is a functional block diagram of one embodiment of a resource management node.

Referring to FIG. 3, a functional block diagram of one embodiment of the resource management node 218 is shown. The resource management node 218 distributes, in the resource distribution system, the resource among the plurality of nodes constituting the application execution unit 200 so as to prevent the inconvenience such as a processing failure caused by too much overhead of a specific node, and further distributes and manages the hardware resource so that the overhead of each node inside the application execution unit 200 can be distributed appropriately, whereby the capability of the application execution unit 200 is not subjected to the restrictions by the capacity of a specific node.

The resource management node 218 communicates mutually with the application execution unit 200 via the LAN 226 and a network adaptor 300. The resource management node 218 implements functional processing means thereof on the server by the execution of a program expanded over the hardware. In the embodiment of FIG. 3, the functional processing means of the resource management node 218 can be implemented as a mesh information acquisition unit 302, an inter-mesh communication amount acquisition unit 304, a node state detection unit 306, an optimum arrangement data registration unit 308, and an objective function minimization unit 310. Herein, further function processing units may be implemented so as to adapt to a specific purpose. The following describes the functional processing units.

(1) The mesh information acquisition unit 302 implements a mesh information acquisition means by expanding a program on the hardware for execution. The mesh information acquisition unit 302 collects hardware resource data that is allocated when the resource management node 218 processes a specific node, such as a mesh identification value of the mesh that the resource management node is currently processing, a memory utilization factor of the mesh, a CPU load and the like, and notifies the objective function minimization unit 310 of the thus collected hardware resource data.

(2) The inter-mesh communication amount acquisition unit 304 implements an inter-mesh communication amount acquisition means by expanding a program on the hardware for execution. The inter-mesh communication amount acquisition unit 304 acquires an inter-mesh communication amount $T_{ij}$, which is a communication amount between a mesh i and a mesh j that mutually communicate via the LAN 226, and notifies the objective function minimization unit 310 of the thus acquired inter-mesh communication amount $T_{ij}$. To this end, the inter-mesh communication amount acquisition unit 304 makes the network adaptor 300 open in a promiscuous mode to monitor all the frames that are transferred over the LAN 226.

The inter-mesh communication amount acquisition unit 304 counts frames including addresses and mesh identification values of the mesh i and the mesh j as targets in their IP headers and payloads, and having MAC addresses with nodes processing those meshes, and averages the counted values over the monitor period, thus generating an inter-mesh communication amount $T_{ij}$ passing through the LAN 226 per unit time concerning the mesh i and the mesh j, and notifies the objective function minimization unit 310 of the inter-mesh communication amount $T_{ij}$. In addition to the data communication between meshes, the inter-mesh communication amount acquisition unit 304 also monitors synchronization notification communication transmitted between meshes in order to let the processing cycle synchronize between the meshes.

(3) The node state detection unit 306 is implemented as node state detection means by expanding a program on the hardware for execution. The node state detection unit 306 monitors the processing capability of the nodes of the application execution unit 200, for example, detects the CPU load of a specific node and the memory utilization ratio of a specific mesh in a node, and provides a starting opportunity for node moving processing that allows the moving of the mesh processing to another node with a less overhead in response to the node capability state in accordance with the present embodiment.

(4) Optimum arrangement data registration unit 308 is implemented as an optimum arrangement data registration means by expanding a program on the hardware for execution. Optimum arrangement data registration unit 308 registers the optimum allocation of the node-processing mesh calculated by the objective function minimization unit 310 using the values acquired by the respective functional processing means described above in (1), (2), and (3). The optimum arrangement data registration unit 308 updates, as the latest optimum arrangement data, the allocation of the node-processing mesh that is acquired at appropriate polling intervals and varies momentarily in response to the execution of the application. Thereafter, in accordance with an explicit request from the node of interest in response to the start of the mesh moving processing or in accordance with a mesh destination instruction from the resource management node 218, the optimum arrangement data registration unit 308 makes the node of interest acquire the latest optimum arrangement data, thus enabling the mesh moving processing for each node.

(5) The objective function minimization unit 310 is implemented as objective function minimization means by expanding a program on the hardware for execution. The objective function minimization unit 310 arranges the meshes of the nodes to manage their resource, and executes the processing of updating the node-processing mesh arrangement so as to minimize the processing overhead of the application execution unit 200 for mesh moving and the overhead for the application execution processing, including the intra-mesh communication amount via the LAN, the number of meshes to be moved and the like. After the start of the mesh moving processing, the processing result by the objective function minimization unit 310 is transmitted to the above-stated optimum arrangement data registration unit 308, which is then updated at predetermined polling intervals, thus enabling the target nodes to refer to the latest arrangement effectively.

In the present embodiment, the objective function is set so as to minimize upper limit values of the processing overhead for the moving processing including the CPU load for each mesh, the memory occupancy state, the inter-mesh communication amount, and the number of meshes to be moved, when the application execution unit 200 executes the application. More specifically, in the present embodiment, the objective function can be set as in the following Formula (1), where the current mesh arrangement is represented as S:

[Formula 1]

$$F(C, M, T, S, S') = \max_p \left( \sum_{i \in S_p} \left( C_i + \sum_{j \in S_p} T_{ij} + s(M_i) \right) + k \times g(S, S') \right) \quad (1)$$

In Formula (1), $C_i$, denotes the CPU load given as CPU computation time or the like for processing mesh i, $M_i$ denotes a memory occupancy state for mesh i, $T_{ij}$ denotes the inter-mesh communication amount between mesh i and mesh j, and k is a cost factor corresponding to a total number of the meshes to be moved, which is a factor that is set beforehand using the average load amount for the moving processing when the application is suspended during the moving processing.

As indicated by Formula (1), the objective function can be minimized by acquiring the upper limit value of the objective function from a set of the meshes to be moved and by repeatingly deciding element meshes of a moving candidate set so as to give a mesh set minimizing the upper limit value. The set of the meshes giving the minimized values may be referred to as a mesh set, and the destination nodes of the mesh set as a whole may be registered in the optimum arrangement data registration unit 308.

In a preferred embodiment, a difference set of the meshes that are required to change the nodes in the generated mesh set may be calculated, and node identification values concerning the elements of the difference set can be registered as the latest optimum destination. In this case also, since the total number of the divided meshes in the virtual space 100 is not very large, the overhead can be suppressed even when the minimization is performed using a round robin algorithm.

The function g(S, S') gives the total number of the meshes to be moved when the moving processing is performed, where S denotes the current mesh arrangement and S' denotes the mesh arrangement after movement. The function $s(M_i)$ gives, when the value of the memory occupancy state in the mesh i exceeds a set threshold, a considerably large figure, whereas gives 0 when the value is the set threshold or less.

Figure 4:
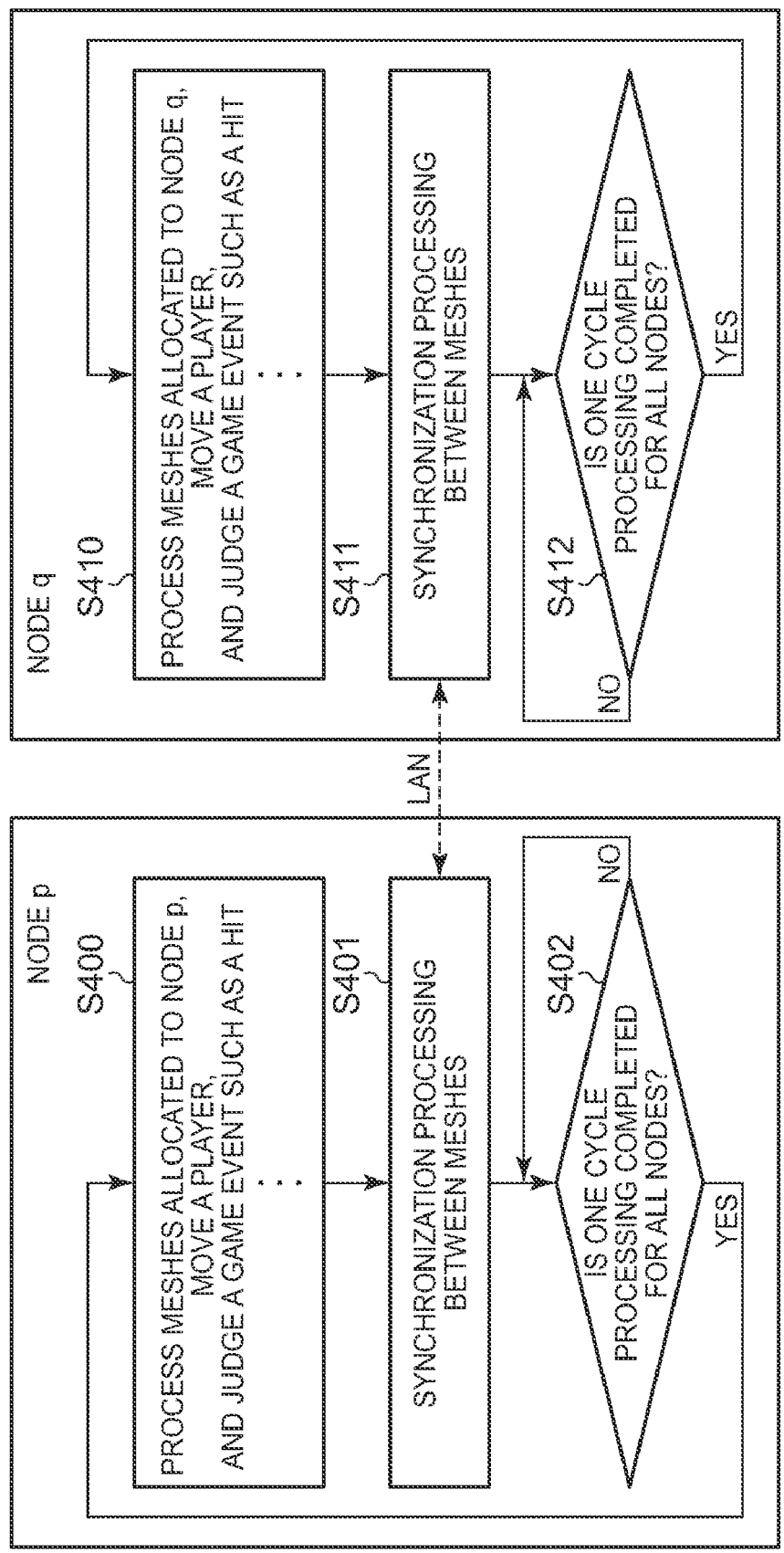
FIG. 4 is a flowchart of one embodiment of the processing executed by the respective nodes when the meshes allocated in the virtual space are processed.

Referring to FIG. 4, a flowchart of one embodiment of the processing for the synchronization notification communication between meshes, which the respective nodes execute when the meshes allocated in the virtual space 100 are processed, is shown. The synchronization notification communication between meshes is utilized for enabling the application for the respective meshes in synchronization with each other to be displayed as the virtual space 100. The processing of FIG. 4 is executed as the inter-node communication via the LAN 226 in addition to the data transmission. Although FIG. 4 is described using the processing between a node p and a node q for the purpose of explanation, similar inter-node communication will be executed also between other nodes. The application execution unit 200 makes the processing cycle be in synchronization with the respective nodes so that the application execution in the virtual space 100 to which a plurality of meshes are allocated does not give strangeness to clients, more specially, to users who access the virtual space 100 via the clients.

The node p, for instance, processes the meshes allocated to the node p at Step S400 to move a player (display object), so as to execute the processing by the application such as bonus processing, e.g., a hit, in the units of set one cycle. At Step S401, for synchronization with other nodes, the node p communicates with the node q via the LAN 226, to monitor the synchronization states of other nodes.

Thereafter, at Step S402, judgment is made as to whether all the meshes have completed the processing of one cycle. If all the meshes have completed the processing of one cycle (yes), the process returns to Step S400, where the next one cycle is started. On the other hand, if all the meshes have not completed the processing of one cycle (no), the processing is made standby until all the meshes have completed the processing of one cycle.

The node q also executes the same processing from Step S410 to Step S412, so as to make the meshes execute the processing of one cycle as the virtual space 100 as a whole in synchronization with each other, thus enabling the synchronization of the display on the virtual space 100. Note here that although the inter-node communication of FIG. 4 describes the case of the transmission from the node p to the node q, in one possible embodiment each of the node p and the node q notifies the resource management node 218 of the synchronization state so as to eliminate the necessity of full-mesh communication between the meshes.

In the present embodiment, the resource management node 218 implements a cycle synchronization table or the like where a cycle synchronization identification value, for example, is registered for a mesh identification value, and therefore the resource management node 218 can judge the cycle synchronization states of all the meshes. If it is judged that the cycles of all the meshes are made in synchronization with each other, the resource management node 218 broadcasts or multicasts the synchronization completion notification to the nodes constituting the application execution unit 200, thus enabling the synchronized updating processing of the meshes in the virtual space 100.

The following describes a data configuration where the nodes constituting the application execution unit 200 and the resource management node 218 respectively manage and register data. FIG. 5 illustrates one embodiment of a mesh management table 500 that the nodes 202, 204, 206, and 208 constituting the application execution unit 200 respectively manage.

The mesh management table 500 of FIG. 5 functions as mesh management means, in which various types of information on the meshes that the nodes of interest currently process is registered. In the mesh management table 500, a mesh identification value 502 for uniquely identifying a mesh in the virtual space 100, an address 504 of the mesh in the network, a mesh capability state 506 that indicates the mesh utilization state of the hardware resource for executing the process in the mesh, resource data 508 that enables the application execution in the unit of meshes, and a moving processing state identification value 510 that indicates the moving process proceeding during the processing are registered, for example.

The mesh identification value 502 indicates a specific region of the virtual space 100, and in one embodiment, a node in charge of the processing of a mesh indicated by the mesh identification value 502 is changed. The address 504 can be designated using a URL, a URI, an absolute path name, a relative path name, or the like as long as it permits a client to identify the mesh for access. The mesh capability state 506 is decided using the CPU load taken for the task executed in the mesh and the memory utilization factor concerning the memory capacity that can be allocated to the mesh, for example, as parameters, and a value indicating the saturation state for the processing in the units of the meshes is registered.

The registered data such as resource data 508, include mesh specific data that are required for mesh display such as graphic data and execution setting, user specific data that is data different for each user such as setting designated by a user and user authentication data, and object specific data that are specific to objects to be displayed in the mesh such as the types of the objects (characters) displayed in the mesh, the moving vectors, and the positions.

In the mesh management table 500, the moving processing state identification value 510 is further registered that indicates that the application execution unit 200 progresses the moving processing at that time. While the moving processing state identification value 510 is set, writing to the mesh with the moving processing state identification value 510 set thereto is prohibited by a program other than that for the moving processing process, thus ensuring the consistency of data during the moving processing. Even in this case, data reading for the mesh as a target of the moving is not limited so that the execution processing interruption by other clients can be a minimum load.

The moving processing state identification value 510 can be set as a flag in a specific embodiment, or in still another embodiment, the moving processing state identification value 510 can be implemented using semaphore or mutex. In the present embodiment, when a specific node is set in a moving state, a notification is made to all other nodes prior to the starting of the node's moving processing so as to block a writing request to the mesh subjected to the moving processing, thus further ensuring the data consistency of the mesh being moved. In the embodiment of FIG. 5, as indicated by hatching, the moving processing state identification value 510 is set for the mesh 4 as a target of the moving processing.

The mesh management table 500 further includes a node capability state 512 registered therein, which is a value indicating the capability saturation state of a node associated with the execution processing of a plurality of meshes. The node capability state 512, in a simple embodiment, can be calculated as a relative ratio 514 of the total sum of the mesh capability states from the mesh 1 to the mesh 4 to $P_{max}$ that is the maximum capability of the node of interest. A weighting factor may be further set corresponding to each capability, so as to control the states in more details.

Referring to FIG. 6, one embodiment is shown of optimum arrangement data 600 that the optimum arrangement data registration unit 308 of the resource management node 218 manages. The optimum arrangement data 600 can be constituted as a table including a current execution node 604 and a latest optimum destination 606 registered therein, both of which correspond to a mesh identification value 602, the current execution node 604 being for registering a node that currently executes the processing of a mesh designated by the mesh identification value, and the latest optimum destination 606 being the latest and optimum destination and giving an optimum arrangement $S_{res}$ after moving. At this time, a null field of the latest optimum destination 606 indicates not moving. The meshes to be moved only may be registered explicitly as shown in FIG. 6 in accordance with a specific embodiment, or a mesh set giving the optimum $S_{res}$ may be registered irrespective of the moving.

When it is determined that a mesh has to be moved, the multinode server system refers to the optimum arrangement data 600 to acquire the latest and optimum mesh arrangement at that time, executes exclusive control with respect to nodes/meshes as targets, and adds a record for registering a mesh identification value with respect to the node 1. Thereafter, the multinode server system reads out the resource data 508 of the mesh 4 in the node 2, and registers the read-out resource data in the record added in the node 1 together with the mesh identification value so as to execute the moving processing.

Figure 7:
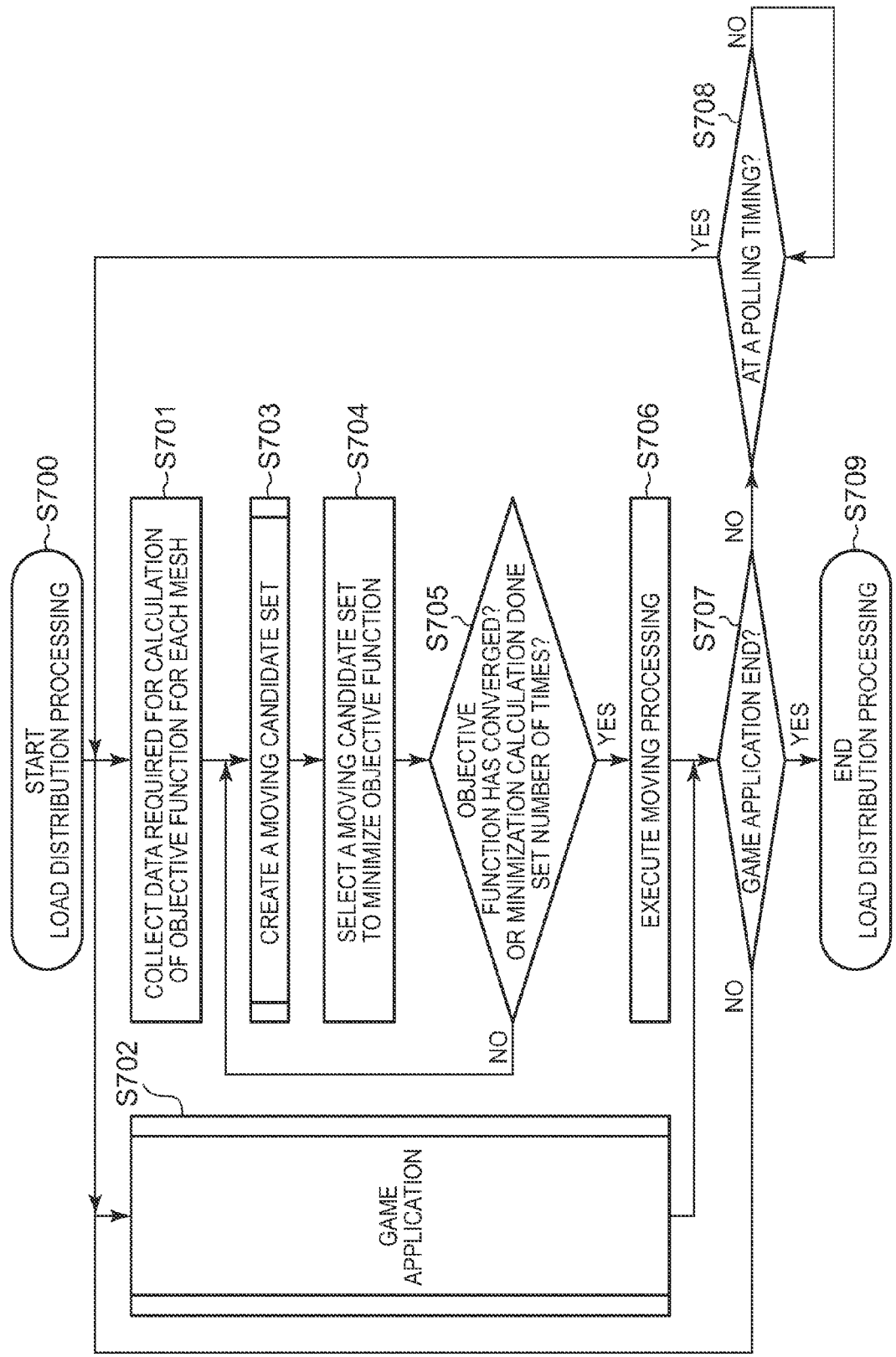
FIG. 7 is a flowchart of one embodiment of the load distribution processing executed by the multinode server system.

Referring to FIG. 7, a flowchart of one embodiment of the load distribution processing executed by the multinode server system is shown. The load distribution processing begins with Step S700, and at Step S701, the resource management node 218 collects data required for the calculation of an objective function for each mesh. Simultaneously, at Step S702, the application execution unit 200 starts the execution of the application. Note here that the following description shows a game application as the application executed in the present embodiment.

At Step S703, the resource management node 218 creates a moving candidate set including the meshes to be moved as elements, and registers additionally a table or the like. The processing at Step S703 is executed as the processing by moving candidate set generation means of FIG. 9 that is implemented by expanding a program on hardware. At Step S704, a mesh set is decided from the elements of the moving candidate set so as to minimize the objective function, which is then set as the moving candidate set. At Step S705, judgment is made as to whether the minimization of the objective function has converged or not or whether the minimization calculation has been completed corresponding to the set number of times or not. If the judgment at Step S705 returns a negative value (no), the process goes to a branch leading to Step S703, so as to create the next moving candidate set.

On the other hand, if the judgment at Step S705 returns a positive value (yes), the process proceeds to Step S706, where the moving processing is executed. During this process, the application execution unit 200 continues the execution of the game application, and at Step S707, judgment is made as to whether a request for the game application end is received from the client or not. If the game application does not end (no), the process goes to a branch leading to Step S702 for further execution of the game application, and during this process, the mesh distribution processing by the resource management node 218 is continued.

Simultaneously, the resource management node 218 refers to a timer counter or the like at Step S708, so as to judge whether it is at a polling timing or not. If it is not at a polling timing at Step S708, the process is made standby at Step S708 until the next polling timing comes. On the other hand, if it is at a polling timing (yes), the process goes to a branch leading to Step S701, where the current state of each mesh is collected for execution of the following resource management. If it is judged as the game application end at Step S707 (yes), the mesh distribution at the time of Step S709, mesh data and the like are stored in a fixed storage device of each node together with user data. Then, the processing by the application execution unit 200 is stopped, and at the same time the load distribution processing also is finished.

Figure 8:
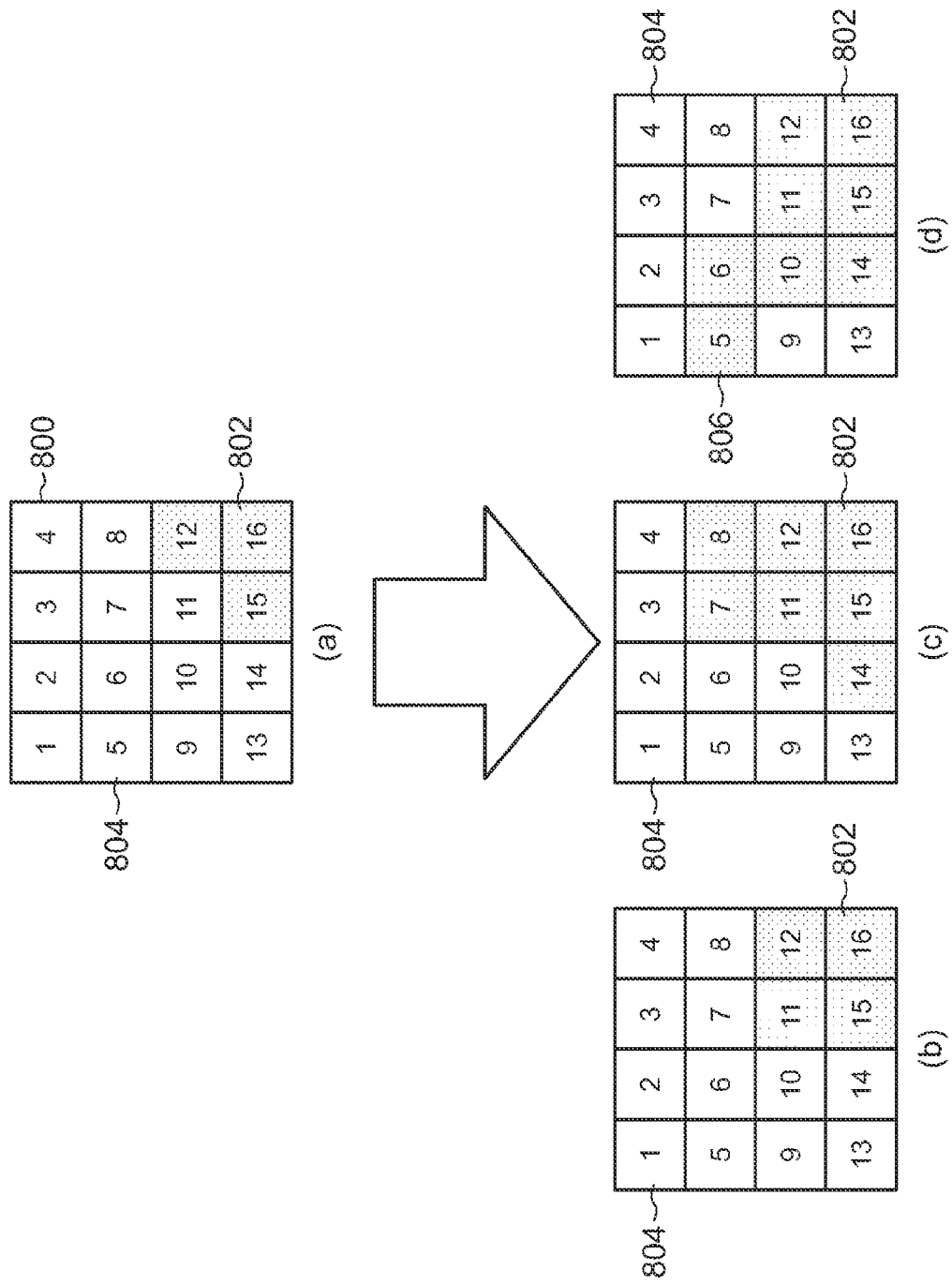
FIG. 8 illustrates one embodiment when the mesh processing node is transferred by the resource management node.

FIG. 8 illustrates one embodiment when the mesh processing node is moved by the resource management node 218. The current mesh arrangement is illustrated in FIG. 8(*a*), and embodiments of elements of a moving candidate set in the mesh processing are illustrated in FIGS. 8(*b*) through 8(*d*). The tables of FIG. 8 can be implemented using a mesh allocation table 800 of the resource management node 218. The mesh allocation tables 800 of FIG. 8 can be constituted as a table in which a node identification value for a processing node is allocated to a mesh identification value. For instance, at a region 804 given by meshes 1 to 11, 13 and 14 in the current mesh arrangement of FIG. 8(*a*), the processing is allocated to node 2, and at a region 802 by meshes 12, 15, and 16, the processing thereof is allocated to node 1.

As illustrated in FIG. 8(*a*), a mesh line 8-11-14 and a mesh line 12-15 specify a server border between the region 802 and the region 804 whose processing servers are different from each other, which are border meshes arranged mutually adjacent to each other.

At this stage, if the node capability state of the node 1 exceeds a permissible capability threshold, if the memory occupancy state of a specific mesh in the node 1 exceeds a memory allocation threshold, or if there is a possibility that the communication state of the LAN in the application execution unit 200 becomes a congestion state, the resource management node 218 starts the moving processing to start generating a moving candidate set. The moving candidate set may be selected by giving a priority to meshes adjacent to the meshes in the node 1 among the meshes included in the node 2. This is because it can be judged that the inter-mesh communication amount $T_{ij}$ between adjacent meshes will be larger than that with other meshes. This is also because meshes that are adjacent to each other but are in different nodes are incorporated into a same node, whereby the inter-mesh communication amount $T_{ij}$ can be changed from the transmission via the LAN to the transmission within the node, thus making the optimum processing of the objective function effective.

As shown in FIG. 8(*b*), in the case where the inter-mesh communication amount between the mesh 11 and the mesh 12, for example, exceeds the communication threshold value, the processing node for the mesh 11 is moved from the node 2 to the node 1, whereby the objective function can be minimized unless other processing conditions are changed. The moving candidate set for minimizing the objective function is illustrated in FIG. 8(*c*). It includes the mesh 7, the mesh 8, the mesh 11, and the mesh 14 adjacent to the region 802 covered by the node 1. Further, as illustrated in FIG. 8(*d*), in accordance with the execution states of the node 2 and the node 1, a larger number of meshes can be selected as the moving candidate set. Note that in FIG. 8(*d*) in order to distribute the processing load of the region 802 and the region 804, a region 806 also is selected as a mesh of the moving candidate set, wherein region 806 is located other than at the server border, for minimizing the upper limit of the objective function by changing an adjacent standard value, for example, with consideration given to the CPU load or the memory utilization factor. The adjacent standard value can be set, for example, as 1 when the mesh is directly adjacent to the mesh of interest and as 2 when a mesh adjacent to the directly adjacent mesh also is included.

Figure 9:
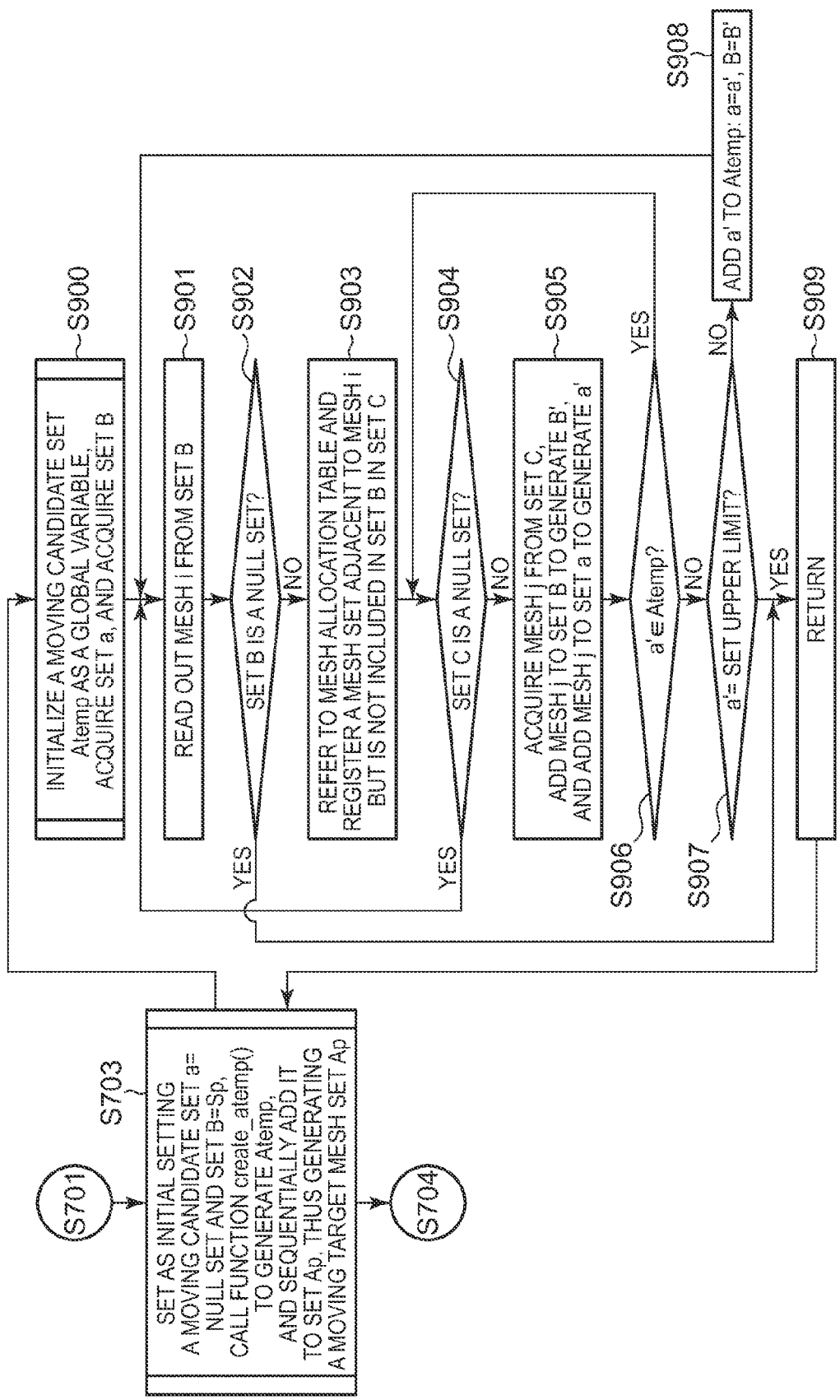
FIG. 9 is a flowchart of one embodiment of the moving candidate set generation processing executed by the resource management node.

Referring to FIG. 9, a flowchart is shown of one embodiment of the processing executed by the resource management node 218 or executed by a moving candidate set generation means. The moving candidate set generation means is called at Step S703 of FIG. 7 to make initial setting of the moving candidate set a and the set B=Sp (a mesh set included in node p). Thereafter, a function create_atemp( ) is called to generate the moving candidate set in an updating manner, a result thereof is registered as a set Atemp, and the set Atemp is additionally registered to the moving candidate set Ap, thus generating a moving target mesh set used for the minimization of the objective function.

When the create_atemp( ) is called at Step S703, then the set Atemp declared as a global variable is initialized, which is set as a null set at Step S900. Further, set a and set B are acquired, which are set as a processing target. At Step S901, the mesh i is read out from the set B, and at Step S902 judgment is made as to whether the set B is a null set or not. In the case of the null set (yes), since the node does not process the mesh at all, the process is made to go to a branch leading to Step S909, so as to return the process. If it is judged that the set B is not a null set at Step S902 (no), the mesh allocation table is referred to at Step S903 to extract a mesh set adjacent to the mesh i but is not included in the set B and register the same in a set C. At Step S904, judgment is made as to whether the set C is a null set or not, and if the set C is a null set, the process is made to go to a branch leading to Step S901 until any mesh constituting the border of the set B can be found out.

If the set C is not a null set at Step S904 (no), the mesh j (residing at the border of the processing target meshes of the set B and corresponding to the meshes processed by another node) is acquired from the set C at Step S905, which is added as an element of the set B to generate a set B', and the mesh j is added to the set a to generate a set a'. At this stage, the meshes to be moved and a mesh arrangement after moving are updated.

At Step S906, judgment is made as to whether the set a' is included as elements of the set Atemp at that time. If it is already included (yes), the process returns back to Step S904 so as to further generate a set a'. On the other hand, if a' is not included as the elements of the Atemp at Step S906 (no), judgment is made as to whether the number of the elements in the set a' becomes a set upper limit or not. If the meshes have been collected so that the number of the elements of the set a' reaches the set upper limit at Step S907 (yes), the process proceeds to Step S909, and Atemp including the elements with the set upper limit is additionally registered in the moving candidate set Ap at Step S703.

On the other hand, if the number of the elements of the set a' is less than the set upper limit at Step S907 (no), the set a' is added to the elements of Atemp at S908, and initial setting is made so as to a=a' and B=B'. Then the process is returned back to Step S901, and the process is repeated until the set upper limit is obtained or the set B become a null set. Then, the process is made to go to a branch leading to Step S704, to feed the resultant as a target mesh for the minimization of the objective function. At this stage, among the meshes adjacent to the set B, the moving candidate set Ap that is a mesh set to be moved to the set B, i.e., to the node p is given.

At Step S704 (FIG. 7), after the objective function converges or the computation is repeated a designated number of times, the mesh set minimizing the objective function is registered in the optimum arrangement data 600 of FIG. 6 as a target mesh for the moving processing including the node p as the destination. This processing is repeatedly executed in response to a polling timing, and the optimum arrangement is updated at every polling timing, thus enabling a response to a change in the processing by the application execution unit 200 effectively.

Figure 10:
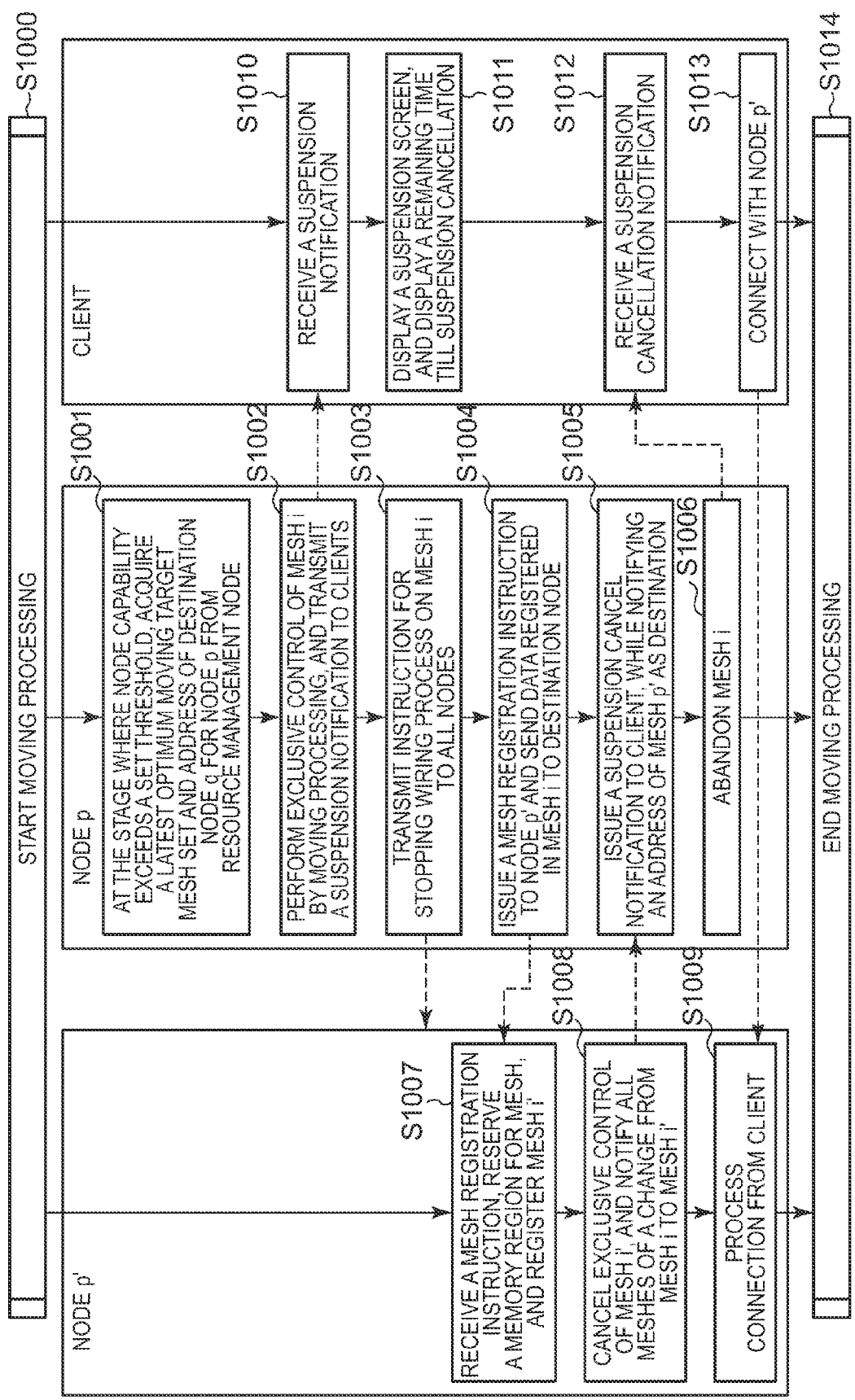
FIG. 10 illustrates a sequence of one embodiment of the moving processing according to the present embodiment.

Referring to FIG. 10, a sequence of one embodiment of the moving processing according to the present embodiment is illustrated. In the sequence of FIG. 10, at Step S1000, the moving processing is activated. The following description is based on the assumption that the node p starts the moving processing, the node p' is a destination node, and the processing of the mesh i that the node p manages is moved.

<Processing by Node p>

At Step S1001, at the stage where the node capability exceeds any one of the respective threshold values set beforehand, the node p acquires, from the resource management node 218, the latest optimum moving target mesh set and a MAC address of the destination node p', which are registered for the node p.

At Step S1002, the node p executes exclusive control such as share lock by the moving processing for the mesh i as the moving target, and at the same time issues a suspension notification of the application execution to all of the clients who access the mesh i.

Thereafter, at Step S1003, the node p transmits an instruction for stopping the wiring process on the mesh i to all other nodes constituting the server nodes. Thus, when other nodes try to write on the mesh i, an exception error will not be sent to the clients who access the meshes in the other nodes, thus preventing the interruption of the processing by the clients irrelevant of the mesh moving.

At Step S1004, the node p issues a mesh registration instruction to the node p', so as to generate an address for referring to the mesh i at the node p' in null records in the mesh management table, and sends data registered in the corresponding field in the mesh i to other null fields for copy. Thereafter, at Step S1005, the node p notifies the client of a suspension cancel notification and an appropriate address such as a global IP address, which is allocated to the mesh i' in the node p' as an access point for letting the client connect therewith, and at Step S1006 the node p abandons the data for the mesh i to complete the processing of the node p as the source of the moving.

<Processing by Node p'>

Meanwhile, upon receipt of a mesh registration instruction at Step S1007, the node p' reserves a memory region for the mesh i', generates a new record in the mesh management table of the node p', and generates a unique address as data for the mesh i' for registration. Thereafter, data transmitted continuously is registered in the corresponding fields. Further, at Step S1008, the node p' cancels exclusive control of the mesh i', and notifies a change from the mesh i to the mesh i' together with the address thereof so as to enable the intra-mesh communication. Thereafter, at Step S1009, the node p' receives an access from the client, and continues the processing after the moving processing to complete the processing at Step S1014.

The above-described processing by the node p and the node p' allows the client that accesses meshes that are not a moving target to continue the virtual space display and the application execution under the minimum restrictions.

<Processing by Client>

At Step S1010, the client receives the suspension notification from the node p, and at Step S1011, displays a suspension screen. Herein, the suspension screen can be displayed, for example, by creating a snap shot of the virtual space 100 at the starting time of the moving processing by the resource management node 218 or the like as BMP, PNG, GIF, JPEG or the like, and registering the same in URI reserved for the suspension screen to be displayed to the client. The time left till the suspension cancellation can be given by the resource management node 218 as bar display corresponding to the progressing state of the moving processing in the form of applet or the display such as "Please wait", for example, in a structured document such as HTML for sending the snap shot.

In the case where the multinode server system is implemented as a game server and the client accesses the multinode server system using a dedicated application, the states of the nodes may be cached in cache memory such as L1 cache memory, L2 cache memory or the like of the client that executes the dedicated application for display. In the case of this embodiment, aside from the reception of HTML from the resource management node 218, the display such as "please wait" registered beforehand by the dedicated application can be displayed to the client. In the present embodiment, the load of the client management by the resource management node 218 can be distributed to the client side, thus allowing the multinode server system side to execute the mesh moving processing more effectively.

At Step S1012, upon receipt of the suspension cancellation notification, the client acquires an address of the mesh i' sent together with the notification at Step S1013 to connect with the node p', and switches the connection from URI for displaying a snap shot to URI for executing the application, to continue the following processing.

Clients not relating to the target mesh of the moving processing can execute the application executed before similarly unless they access the meshes as the moving target. Further, even when the clients try to move to the meshes as the moving target, since the writing issue stop instruction to the mesh i is valid, the moving to the meshes as the moving target will be limited just during the moving processing time period. Since a writing request on the mesh i or the like from the mesh of interest is not issued, an exception error will not occur, so that the effects by the processing stop due to the moving processing on the clients who execute the application at the meshes other than the moving target can be minimized. Then, at the time when the moving processing has been completed, all the clients can access the meshes after moving and execute the application while collaborating with each other.

Figure 11:
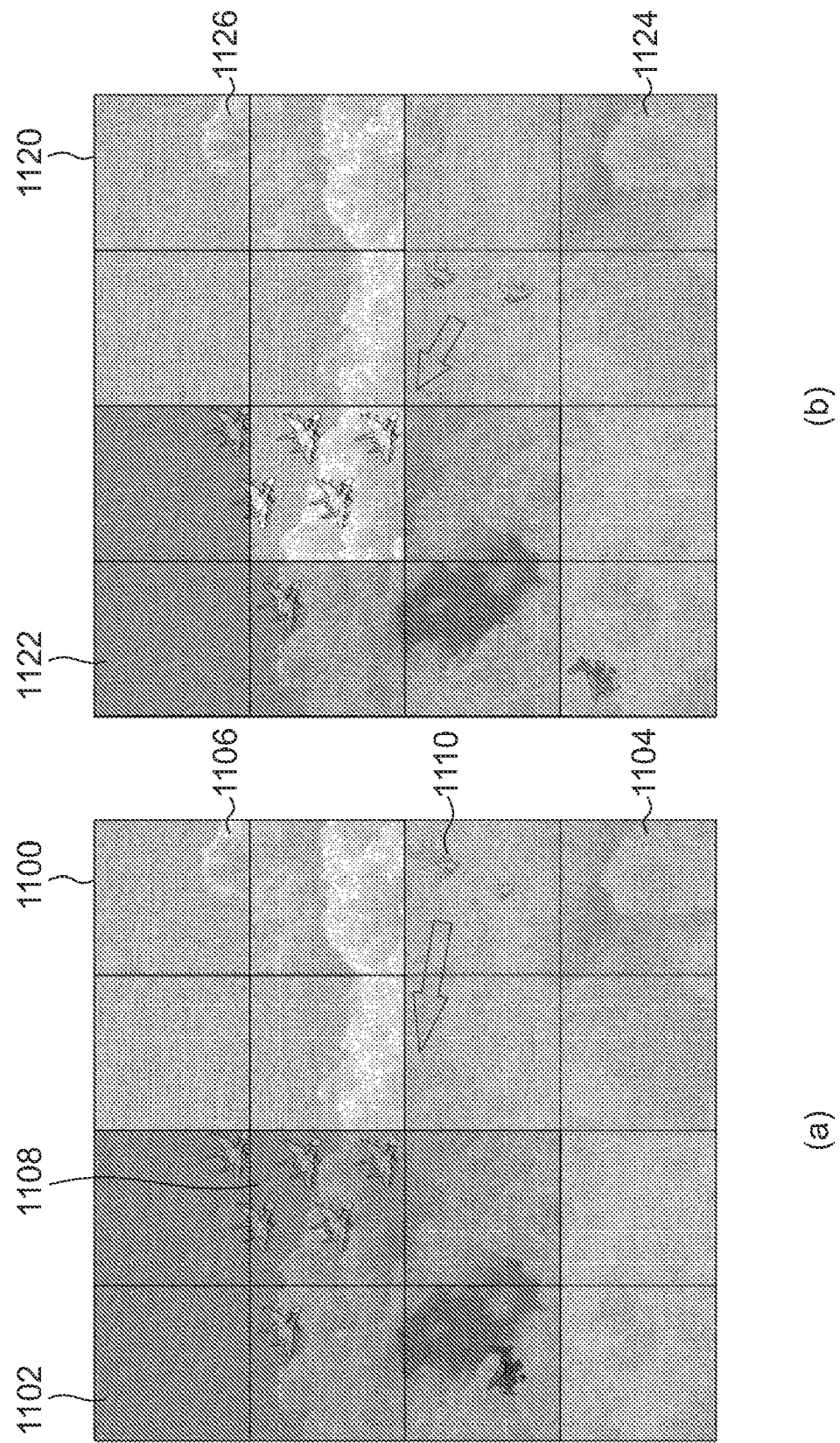
FIG. 11 illustrates one embodiment of the node movement that processes meshes according to the load distribution method of the present embodiment.

FIG. 11 illustrates one embodiment of the node movement that processes meshes according to the load distribution method of the present embodiment. In the embodiment of FIG. 11, the multinode server system is constituted as a game server, i.e., as a flight simulator in which a plurality of objects such as airplanes are displayed on the virtual space by the execution of the application. In the embodiment of FIG. 11(*a*), sixteen meshes are allocated to the virtual space 1100, and three nodes execute the mesh processing included in regions 1102, 1104, and 1106, respectively.

Herein, the node 1 executes the processing of the region 1102, the node 2 executes the processing of the region 1106, and the node 3 executes the processing of the region 1104. The mesh 1108 in the region 1102 has the highest number of display objects and the highest density, and it is assumed that the CPU load amount allocated thereto exceeds a threshold at the mesh 1108. At this stage, the moving processing is called, the image illustrated in FIG. 11(*a*) is provided to the user as a snap shot, and in a preferred embodiment the display such as "please wait" is displayed.

During this, an optimum arrangement data is acquired, and the processing allocation of the meshes to the nodes is changed. After the change, based on addresses of the meshes newly allocated to the user, the processing of the flight simulator is continued on the virtual space. FIG. 11(*b*) illustrates the mesh arrangement after the change of the mesh allocation. As illustrated in FIG. 11(*b*), as a result of the movement of the mesh 1108 to the processing by the node 2, the region 1102 of FIG. 11(*a*) is changed to a region 1122, and at the same time as a result of the addition of the mesh 1108, the region 1106 executes the meshes indicated as a region 1126.

Prior to the movement, the node 2 has the least processing load, which simply displays a background image as illustrated in FIG. 11(*a*), which means that the processing load cannot be distributed well over the entire nodes. In FIG. 11(*b*), however, each of the node 1, the node 2, and the node 3 processes the display objects, and it can be understood that the load distribution is enabled by the minimum mesh movement.

The present embodiment is applicable not only to a match-up type game such as flight simulator, racing game, or battle game but also to a living environment type game such as "SecondLife". In the case of the living environment type game, even when the client suspends the game or forced movement such as warp to another position occurs, the realism of the game can be kept, and therefore the present invention can be applied more preferably. As another embodiment, the present invention is applicable to a moving-image delivery service via a network, in which a plurality of linked display regions may be constituted on display screens of clients so as to allow a plurality of clients to share their application execution screens with each other.

As stated above, according to the present invention, a multinode server system, a load distribution method of a multinode server system, and a program can be provided, by which in the multinode server system including servers as nodes, where a plurality of nodes are mutually connected, it is possible to distribute the hardware resource so as to optimize the processing efficiency of the multinode server system in the units of regions of the virtual space, and it is possible to minimize the influences on the client by the suspension of the application during the redistribution processing of the hardware resource in the server system.

The above-stated functions of the present invention can be implemented by a device-executable program that is written in an object-oriented programming language such as C++, Java (registered trademark), Java (registered trademark) Beans, Java (registered trademark) Applet, Java (registered trademark) Script, Perl or Ruby, which then can be stored in a device-readable media for distribution.

The invention has been described by way of embodiments thereof. The present invention, however, is not limited to the embodiments, and it will be clear to those skilled in the art that other embodiments, additions, changes and deletions are possible. Those skilled in the art will recognize they can make modifications and variations without departing from the spirit and scope of the invention as defined by the appended claims.

The invention claimed is:

1. A multinode server system for forming a virtual space, comprising:
    application execution means including a plurality of mutually connected servers, each of which processes at least one of a plurality of meshes obtained by dividing the virtual space, and displays a result of processing for each mesh as the virtual space;
    resource management means for detecting load states of the servers of the application execution means, and changes allocation of the servers to process the meshes in accordance with the load states;
    network means for allowing a plurality of clients to share the virtual space via a network; and
    inter-mesh communication amount acquisition means for acquiring an inter-mesh communication amount of inter-mesh communication between each mesh by counting frames including addresses and mesh identification values of each mesh as targets in their IP headers and payloads, and averaging the counted values over a monitor period;

wherein the resource management means selects a border mesh that specifies a server border across which the servers to process the meshes are to be changed, and changes the servers to process the meshes including the border mesh in response to the load states, wherein the resource management means generates a mesh set that minimizes an objective function including the inter-mesh communication amount between different servers, a memory utilization factor of the servers, and a total number of meshes to change allocation thereof, and wherein the resource management means includes objective function minimization means that changes the allocation of the servers in accordance with the mesh set.

2. The multinode server system according to claim 1, wherein the resource management means changes the allocation by changing the server border so that the inter-mesh communication between the servers becomes intra-node communication within a single server.

3. The multinode server system according to claim 1, further comprising exclusive control means that designates meshes for which allocation of the servers is to be changed, and then performs exclusive control of at least a writing access to the meshes for which allocation of the servers is to be changed.

4. The multinode server system according to claim 1, wherein:

each server includes mesh management means that adds or deletes, in response to an allocation change of the meshes, a mesh identification value of a mesh that the server processes, an address that uniquely identifies the mesh, and resource data that the mesh uses, to update the same, and the resource management means includes optimum arrangement data registration means that periodically detects the inter-mesh communication of the plurality of servers, and the memory utilization factor of the servers, and registers, as a latest optimum arrangement data, the mesh set that minimizes the objective function.

5. The multinode server system according to claim 4, wherein the multinode server system is a game server, and allows clients, other than a client that accesses the meshes as an object of the allocation change, to continue reading processing of the resource data of all the meshes in the virtual space.

6. The multinode server system according to claim 1, wherein the objective function is $$F(C, M, T, S, S') = \max_p \left( \sum_{i \in S_p} \left( C_i + \sum_{j \notin S_p} T_{ij} + s(M_i) \right) + k \times g(S, S') \right)$$

where $C_i$ is a CPU computation time for processing mesh i, $T_{ij}$ is the inter-mesh communication amount between mesh i and mesh j, $M_i$ is a memory occupancy state for mesh i, and a function $s(M_i)$ gives a large value when $M_i$ exceeds a set threshold and gives 0 when $M_i$ is at the set threshold or less, and where k is a cost factor corresponding to a total number of meshes to be moved, and further where a function g(S, S') gives a total number of meshes to be moved, where S is a current mesh arrangement and S' is a mesh arrangement after movement.

7. A load distribution method that distributes load among a plurality of servers mutually connected to provide a virtual space, the load distribution method comprising the steps of:

allocating, to each of the plurality of servers, meshes obtained by dividing the virtual space that the server processes;

detecting load states of the servers generated as a result of processing of an application in the meshes;

changing allocation of the servers to process the meshes in accordance with the load states;

enabling a plurality of clients to share the virtual space via a network; and acquiring an inter-mesh communication amount of inter-mesh communication between each mesh by counting frames including addresses and mesh identification values of each mesh as targets in their IP headers and payloads, and averaging the counted values over a monitor period, wherein the step of changing allocation of the servers includes a step of selecting a border mesh that specifies a server border across which the servers to process the meshes are to be changed, and a step of changing the servers to process the meshes including the border mesh in response to the load states, and wherein the step of detecting the load states of the servers includes a step of deciding meshes to change allocation thereof so that an objective function can be minimized, the objective function including the inter-mesh communication amount between different servers, a memory utilization factor of the servers, and a total number of the meshes for which the allocation is to be changed.

8. The load distribution method according to claim 7, wherein the step of changing allocation of the servers includes a step of changing the server border so that the inter-mesh communication between the servers is intra-node communication within a single server.

9. The load distribution method according to claim 8, further comprising the steps of:

processing, in response to an allocation change of the meshes, an identification value of the mesh that the server processes, an address that uniquely identifies the mesh, and resource data that the mesh uses, to update the same; and periodically detecting the inter-mesh communication of the plurality of servers, and the memory utilization factor of the servers, and registering, as a latest optimum arrangement data, the mesh set that minimizes the objective function.

10. The load distribution method according to claim 9, wherein the plurality of servers form a game server, the method further comprising the following steps of:

designating meshes for which allocation of the servers is to be changed, and then performing exclusive control of at least a writing access to the meshes for which allocation is to be changed; and enabling clients, other than a client that accesses the meshes as an object of the allocation change, to continue reading processing of the resource data of all the meshes in the virtual space.

11. The load distribution method of claim 7, wherein the objective function is $$F(C, M, T, S, S') = \max_p \left( \sum_{i \in S_p} \left( C_i + \sum_{j \notin S_p} T_{ij} + s(M_i) \right) + k \times g(S, S') \right) \quad (1)$$

where $C_i$ is a CPU computation time for processing mesh i, $T_{ij}$ is the inter-mesh communication amount between mesh i and mesh j, $M_i$ is a memory occupancy state for mesh i, and a function $s(M_i)$ gives a first value when $M_i$ exceeds a set threshold and gives a second value when $M_i$ is at the set threshold or less, and where k is a cost factor corresponding to a total number of meshes to be moved, and further where a function g(S, S') gives a total number of meshes to be moved, where S is a current mesh arrangement and S' is a mesh arrangement after movement.

12. The load distribution method of claim 7, wherein the step of detecting the load states of the servers includes repeatingly deciding which meshes are elements of a moving candidate set so as to result in a mesh set that minimizes an upper limit value of the objective function.

13. A non-transitory storage medium tangibly embodying computer-executable program instructions for causing a computer to execute the following steps:
   allocating, to each of a plurality of servers, meshes obtained by dividing the virtual space that the server processes;
   detecting load states of the servers generated as a result of processing of an application in the meshes;
   changing allocation of the servers to process the meshes in accordance with the load states; and
   enabling a plurality of clients to share the virtual space via a network,
   wherein the step of changing allocation of the servers includes a step of selecting a border mesh that specifies a server border across which the servers to process the meshes are to be changed, and a step of changing the servers to process the meshes including the border mesh in response to the load states, and
   wherein the step of detecting the load states of the servers includes a step of deciding meshes to change allocation thereof so that an objective function F is minimized, the objective function including an inter-mesh communication amount between different servers, a memory utilization factor of the servers, and a total number of the meshes for which the allocation is to be changed, and
   wherein the objective function is $$F(C, M, T, S, S') = \max_p \left( \sum_{i \in S_p} \left( C_i + \sum_{j \notin S_p} T_{ij} + s(M_i) \right) + k \times g(S, S') \right) \quad (1)$$

where $C_i$ is a CPU computation time for processing mesh i, $T_{ij}$ is the inter-mesh communication amount between mesh i and mesh j, $M_i$ is a memory occupancy state for mesh i, and a function $s(M_i)$ gives a non-zero value when $M_i$ exceeds a set threshold and gives a zero value when $M_i$ is at the set threshold or less, and where k is a cost factor corresponding to a total number of meshes to be moved, and further where a function g(S, S') gives a total number of meshes to be moved, where S is a current mesh arrangement and S' is a mesh arrangement after movement.

14. A resource management server for a multinode server system that forms a virtual space, comprising:
   application execution means including a plurality of servers mutually connected, each of which processes at least one of a plurality of meshes obtained by dividing the virtual space, and displays a result of processing for each mesh as the virtual space;
   load state detection means that detects load states of the servers;
   moving candidate set generation means for generating a moving candidate set of meshes for which allocation of the servers is to be changed by selecting a border mesh specified by a plurality of meshes that are adjacent to each other but are processed by different servers;
   objective function minimization means for listening to inter-mesh communication between different servers to generate a mesh set that minimizes an objective function including intra mesh inter-mesh communication between different servers, a memory utilization factor of the servers, and a total number of meshes for which allocation is to be changed; and
   optimum arrangement data registration means for registering, as latest optimum arrangement data of the meshes, the mesh set,
   wherein the resource management server changes the servers to process the meshes including the border mesh in response to the load states.

15. The resource management server according to claim 14, wherein the resource management server changes allocation by changing the server border so that the inter-mesh communication between the servers is intra-node communication within a server.

16. The resource management server of claim 14, wherein the objective function is $$F(C, M, T, S, S') = \max_p \left( \sum_{i \in S_p} \left( C_i + \sum_{j \notin S_p} T_{ij} + s(M_i) \right) + k \times g(S, S') \right) \quad (1)$$

where $C_i$ is a CPU computation time for processing mesh i, $T_{ij}$ is an inter-mesh communication amount between mesh i and mesh j, $M_i$ is a memory occupancy state for mesh i, and a function $s(M_i)$ gives a first value when $M_i$ exceeds a set threshold and gives a second value when $M_i$ is at the set threshold or less, and where k is a cost factor corresponding to a total number of meshes to be moved, and further where a function g(S, S') gives a total number of meshes to be moved, where S is a current mesh arrangement and S' is a mesh arrangement after movement.

* * * * *